United States Patent [19]

Smith

[11] Patent Number: 4,671,033

[45] Date of Patent: Jun. 9, 1987

[54] SUSPENDED CEILINGS

[75] Inventor: Ian W. Smith, Stokenchurch, England

[73] Assignee: Frenger Troughton Limited, Middlesex, England

[21] Appl. No.: 794,372

[22] Filed: Nov. 4, 1985

[30] Foreign Application Priority Data

Nov. 2, 1984 [GB] United Kingdom ................. 8427734

[51] Int. Cl.⁴ .............................................. E04B 5/48
[52] U.S. Cl. ..................................... 52/220; 52/484; 52/761; 52/27
[58] Field of Search ...................... 52/27, 39, 484, 488, 52/726, 220, 761, 762

[56] References Cited

U.S. PATENT DOCUMENTS

| | | | |
|---|---|---|---|
| 2,729,431 | 1/1956 | Little | 52/220 X |
| 2,800,308 | 7/1957 | Parkinson et al. | 52/220 X |
| 2,818,235 | 12/1957 | Baran | 52/220 X |
| 4,570,391 | 2/1986 | Quante et al. | 52/39 |

FOREIGN PATENT DOCUMENTS 1008470 5/1957 Fed. Rep. of Germany ........ 52/488
1259982 3/1961 France .................................. 52/220

Primary Examiner—Carl D. Friedman
Assistant Examiner—Naoko N. Slack
Attorney, Agent, or Firm—Wenderoth, Lind and Ponack

[57] ABSTRACT

A suspended ceiling has a grid formed from a number of parallel first support sections and a number of parallel second support sections extending perpendicular to and between the first support sections.

The support sections are extruded from a metal having good heat conduction properties and are adapted to be interconnected by cruciform connectors thereby to form a lattice of regular quadrilaterals. The grid carries a pipe through which flows a heated fluid and which extends in a serpentine path along an upper surface of the first support sections and along upper surface of the second support sections at the edges of the ceiling. The pipe is secured in good heat conducting relationship to the first support sections by a series of clips. Ceiling panels made from a heat-insulating material occupy the spaces between the first and second support sections. The supporting grid thereby constitutes a heating system for the room below the ceiling.

9 Claims, 12 Drawing Figures

SUSPENDED CEILINGS

The invention relates to suspended ceilings.

According to the invention there is provided a suspended ceiling comprising a grid of supporting members at least some of which are made from a metal having good heat conduction properties, at least one of which metal supporting members has extending lengthwise thereof and in good heat conduction relationship therewith a pipe which is secured to an upper surface of the member and which is connected to a supply of heat exchange fluid, suspension means connected to the grid to effect suspension of the grid from a fixed support structure and ceiling panels interposed between and supported by said supporting members.

The grid may conveniently comprise a first set of the supporting members extending in parallel relation to each other and a second set of the supporting members extending in parallel relation to each other and in perpendicular relation to said first members, said first and second sets of supporting members being interconnected and defining a lattice of regular quadrilaterals. Preferably each supporting member of the first set comprises a plurality of sections of substantially the same length as each other and connected together end-to-end by means of connectors interposed between the sections, and each supporting member of the second set comprises a plurality of sections of substantially the same length as each other and connected to said connectors so as to extend between the lines of the first set of supporting members.

According to a preferred feature of the invention each supporting member of the first set has on its upper surface a channel of part-cylindrical form for receiving said pipe or one of said pipes to which the member is to be connected, the radius of curvature of the channel being substantialy equal to that of such pipe, and means for retaining a clip extending about the pipe to connect said supporting member to the pipe.

The ceiling is preferably suspended by means of suspension rods each of which is attached at one end to the fixed support structure and at its other end to one of said clips. Preferably, outwardly and downwardly inclined surfaces extend from each side of said channel which surfaces at their lowermost points are undercut to form lengthwise slots beneath the channel, which slots constitute the clip retaining means. In one preferred arrangement the sections of the supporting members of the second set are formed with slots similar to those in the sections of the supporting members of the first set and wherein the connectors are cruciform and have tongues projecting into engagement in the slots in the sections of the first and second sets of supporting members.

One embodiment of the invention will now be described by way of example. The description makes reference to the accompanying diagrammatic drawings in which:

FIG. 1 is a plan view from above a suspended ceiling according to the invention, FIG. 2 is an end view of one form of support member used in the construction of FIG. 1, FIG. 3 is an end view of another form of support member used in the construction of FIG. 1, FIG. 4 is a plan view of a connector used to join the support members of FIGS. 2 and 3, FIG. 4A is a side view of the connector shown in FIG. 4, FIG. 5 is an end view of a clip used to secure a pipe to the support member of FIG. 2, FIG. 6 is an end view of a clip used to support the ceiling of FIG. 1;

Figure 1:
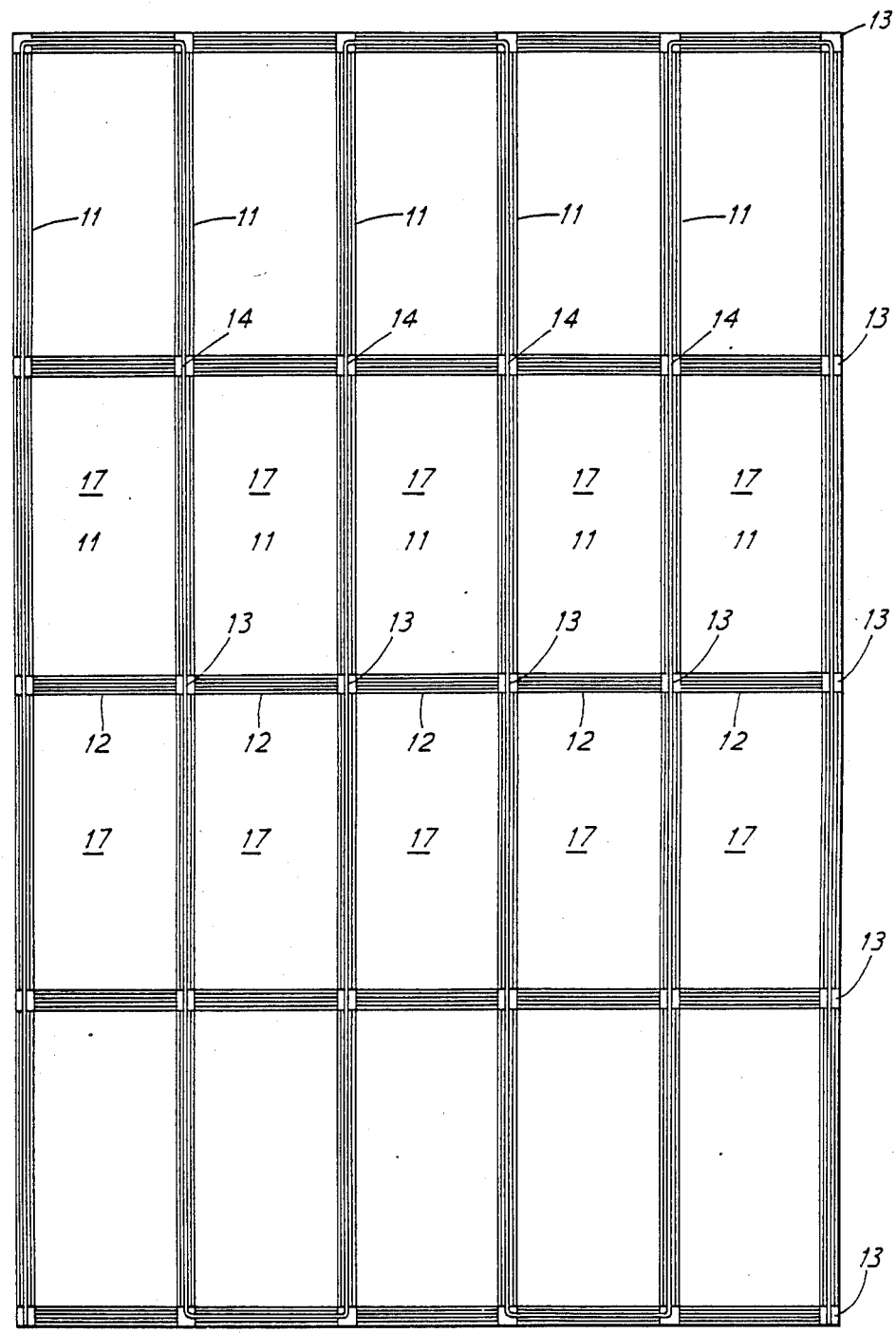
Figure 2:
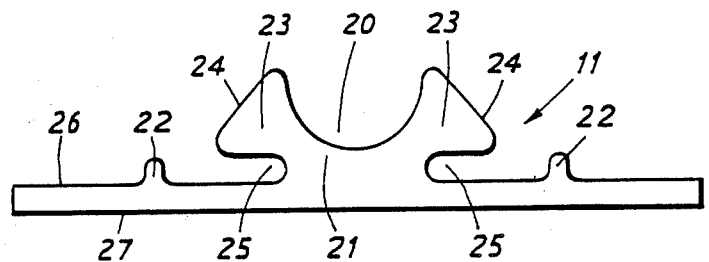
Figure 3:
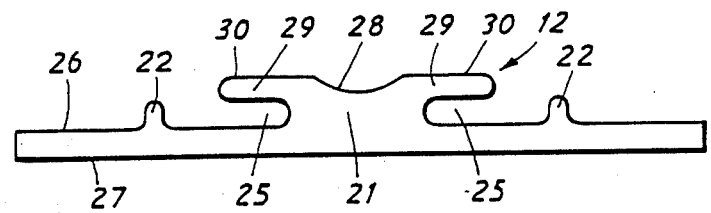

Referring to FIGS. 1 to 11, the suspended ceiling comprises a grid 10 having a plurality of first supporting members extending in a regularly spaced series of parallel lines and a plurality of second supporting members extending in a regularly spaced series of parallel lines perpendicular to the lines of the first series. Each first supporting member comprises a plurality of first support sections 11 of substantially the same length as each other and each sound supporting member comprises a number of second support sections 12 of substantially the same length as each other, the ends of which sections 11, 12 are joined to form the grid 10 by means of cruciform connectors 13. The grid 10 carries a pipe 14 through which flows a heated fluid and ceiling panels 17 which panels occupy the spaces between the support sections 11, 12.

Each section 11 is of constant cross-section and is extruded from aluminium or an alternative metal of good heat conductivity. A channel 20 of part cylindrical cross-section extends centrally along a central broad rib formation 21 on the upper face of the section 11 and the pipe 14 is a snug fit in the channel so as to provide good thermal contact between the surface of the channel 20 and the pipe 14. Each section 11 has two oppositely disposed projections 22. Lugs 23 are formed on the broad rib 21 at opposite sides of the channel 20 and have laterally outward facing surfaces 24 which are oblique and face upwards and laterally outwards. The upper extremities of the surfaces 24 curve laterally inwards so as to form smooth continuations of the surface of the channel. At the lower extremities of the surface 24 there are provided undercuts which complete the lugs and which are in the form of slots 25 parallel to generally planar principal upper and lower surfaces 26, 27 of the section 11, the width of the broad rib formation 21 between the two slots 25 being substantially equal to the diameter of the pipe 14.

Each section 12 is also of constant cross-section and is extruded from aluminium or other metal having good heat conductivity characteristics. Each section 12 has many features in common with the sections 11 both in form and in size, these are the broad rib 21, the projections 22, the slots 25 and the upper and lower surfaces 26, 27. However the broad rib 21 is truncated and has a shallow channel 28 which has the same radius of curvature as the channel 20 and is also able to receive the pipe 14. The broad rib of each section 12 does not provide lugs 23 having oblique surfaces 24 but provides a pair of oppositely-projecting flanges 29 having generally planar upper surfaces 30 parallel to the upper and lower surfaces 26, 27 and planar lower surfaces constituting the upper faces of the slots 25.

Figure 4:
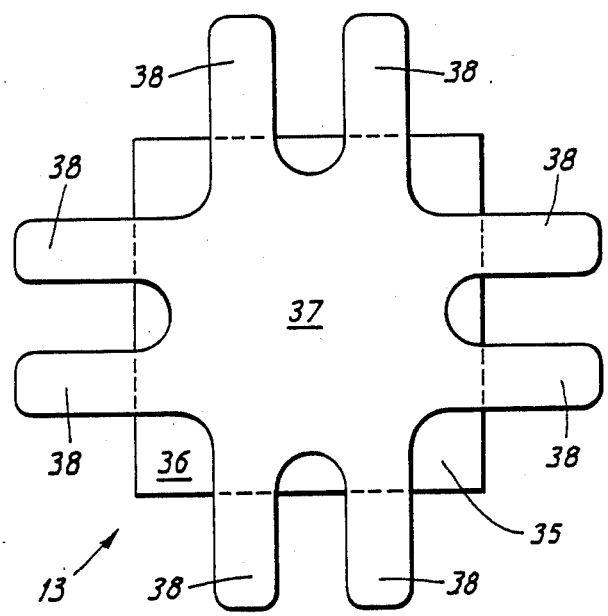
Figure 4A:
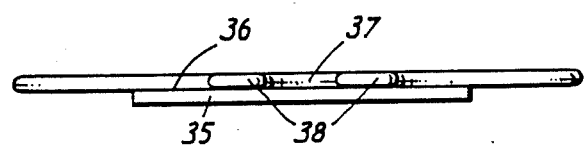
Figure 5:
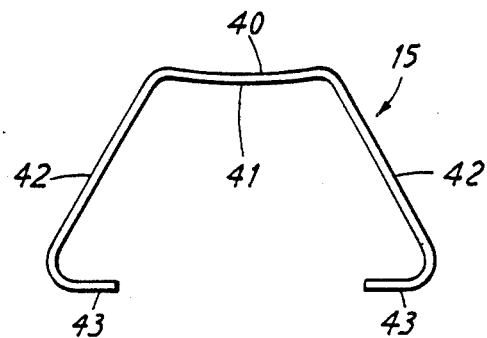
Figure 6:
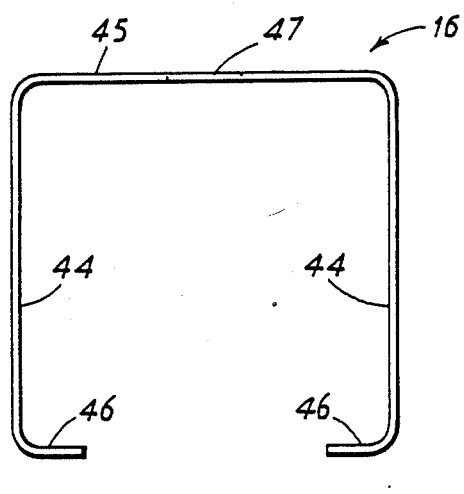
Figure 7:
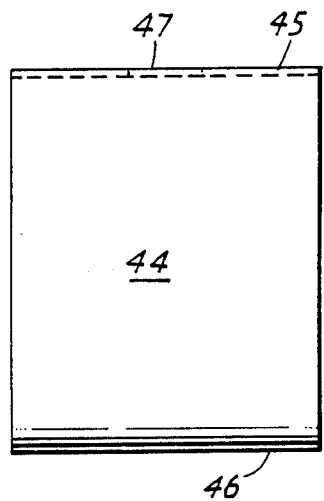
FIG. 7 is a side view of the clip shown in FIG. 6.
Figure 8:
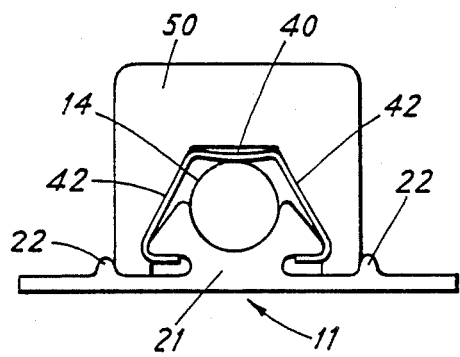
FIG. 8 is an end view of a support member with a pipe secured thereto.
Figure 9:
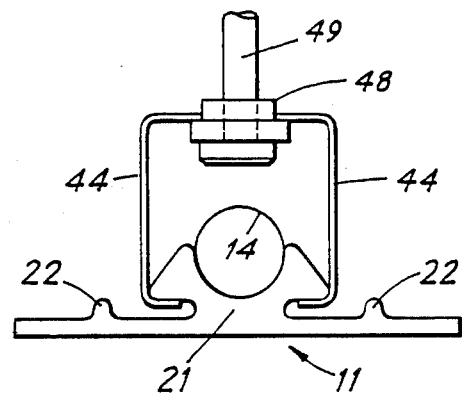
FIG. 9 is an end view of a support member with a clip shown in FIGS. 6 and 7 attached thereto.
Figure 10:
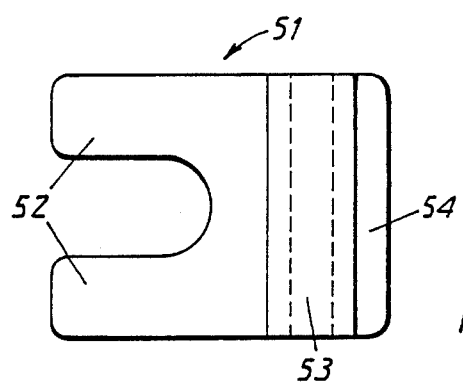
FIG. 10 is a plan view of an adaptor suitable for use in the ceiling of FIG. 1.
Figure 11:
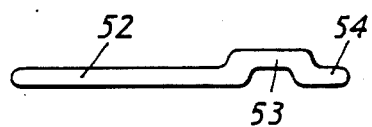
FIG. 11 is an end view of the adaptor shown in FIG. 10.

Each connector 13 (see FIGS. 4 and 4A) has a square lower portion 35 having an upper surface 36 on which is centrally disposed an upper portion 37. The upper portion 37 has eight tongues 38 projecting perpendicularly beyond the lower portion 35, two from each of its four sides. The pairs of tongues 38 are disposed symmetrically about the connector and are arranged so that the tongues can be inserted into the slots 25 in the supporting sections 11, 12 to be connected. The dimensions and form of the tongues 38 are adapted so that each tongue is a snug fit in the space defined by its associated slot 25 and its adjacent projection 22, thus ensuring a firm connection between the connector 13 and a supporting section.

The width of the lower portion 36 and its thickness are identical to the width and thickness of the sections 11, 12 so that the lower face of the connectors are generally flush with the lower faces of the sections 11, 12 connected to them.

As shown in FIG. 1 there exist junctions at the edge of the suspended ceiling where there are only two members connected to each connector 13 or three members connected to each connector 13. The tongues that are redundant are cut off.

The pipe 14 is secured to the sections 11 by means of first spring clips 15 employed at intervals along the pipe's length, said clips extending about the pipe. Each clip has a downwardly curved central portion 40, the lowermost point 41 of which lies against the pipe 14. Two straight legs 42 extend obliquely outwards from the curved portion, the free ends of the legs 42 extending horizontally inwards to form retaining feet 43. The free ends of the feet 43 are spaced so that when fastening the pipe to one of the support section 11 the tips of the feet meet the oblique surfaces 24 so as to be pressed apart by the cam action of surfaces 24 when downward pressure is applied. When the tips have passed the widest part of the broad rib, the feet snap into the slots 25 thus rigidly holding the pipe to the support section 11. Insulating material 50 is put around the pipe and broad rib but does not extend beyond the projections 22.

The support sections 11 are suspended from a fixed supporting structure (not shown) by means of spring clips 16 having a top portion 45, sides 44 extending perpendicularly from the ends of the top and two feet 46 constituted by the free ends of the sides 44 which feet extend horizontally inwards. The free ends of the feet are spaced for attachment to the support sections 11 in a similar manner to that disclosed above in respect of the clips 15.

In the top of each clip 16 is a circular hole 47, into which hole is inserted an insulating bush 48 and a suspension rod 49 extending through the bush to support the ceiling.

The ceiling panels 17 are made of any suitable heat-insulating material and have a flange about their periphery which is adapted to rest on the upper surface 26 of the support sections 11, 12 remote from the broad rib 21 and outside the projections 22.

Additional support sections 12 can be added to the grid if it is desired to use smaller ceiling panels 17. Connectors 13 are not required; instead, adaptors 51 (see FIGS. 10 and 11) are employed. Each adaptor has two tongues 52 of similar dimensions and construction to the tongues 38 of the connector 13. Remote from the tongues is a lip 54 and a bridge 53 is disposed between them. The tongues 52 are inserted into the slot 25 in one end of the section 12 and the tongues of another adaptor inserted at the other end of the section. The lips 54 are inserted into the slots 25 of adjacent sections 11 and the bridge 53 serves to prevent fouling of the projections 22.

It will be appreciated that the pipe simply rests in the channel 28 of sections 12 and that sections 12 could be replaced by further sections 11.

The pipe 14 extends in a serpentine path along the sections 11 and along sections 12 at the edges of the ceiling, but other arrangements may be used if desired.

Thus the invention provides a suspended ceiling in which ceiling panels, e.g. of heat insulating material, are carried by a supporting grid which constitutes a heating means for the space beneath the ceiling. The ceiling combines the advantages of suspended ceilings and of heated ceilings, while being relatively inexpensive and easy to assemble.

I claim:

1. A suspended ceiling comprising:
   a grid of supporting members, each of said supporting members being an extruded section made from a metal having good heat conduction properties, the extruded sections each having principal surfaces which respectively face upwardly and downwardly, tfhe upwardly facing surface having a lengthwise extending central broad rib formation integral with the extruded section and having an upwardly-facing channel with a part cylindrical cross-section,
   a pipe secured in said channel, said pipe having an external diameter corresponding to the diameter of said channel, whereby the pipe is in close heat transmitting contact with the rib formation, said pipe being adapted to be connected to a supply of heat exchange fluid;
   suspension means connected to the grid to suspend the grid from a fixed support structure; and
   ceiling panels interposed between and supported by said supporting members.

2. A suspended ceiling as claimed in claim 1, wherein the grid comprises a first set of the supporting members extending in parallel relation to each other and a second set of the supporting members extending in parallel relation to each other and in perpendicular relation to said first members, said first and second sets of supporting members being interconnected and defining a lattice of regular quadrilaterals.

3. A suspended ceiling as claimed in claim 2 in which each supporting member of the first set comprises a plurality of sections of substantially the same length as each other, and connectors interposed between adjoining sections and connecting the sections together end to end.

4. A suspended ceiling as claimed in claim 2, wherein each supporting member of the second set comprises a plurality of sections of substantially the same length as each other and connected to said connectors so as to extend between the lines of the first set of supporting members.

5. A suspended ceiling as claimed in claim 1, wherein the ceiling panels are formed from a heat-insulating material.

6. A suspended ceiling as claimed in claim 1, further comprising clips anchored to said supporting members and extending around the pipe and securing said supporting members to said pipe.

7. A suspended ceiling as claimed in claim 6, wherein each of said supporting members has a downwardly and outwardly inclined surface extending from each side of said channel, said surfaces being undercut at their lowermost points to form slots beneath the channel, and said clips having portions thereof engaged in the slots to anchor the clips.

8. A suspended ceiling as claimed in claim 7, wherein the cross-sections of the supporting members of the second set have slots similar to those in the cross-sections of the supporting members of the first set, and wherein said connectors are cruciform and have tongues projecting into engagement in said slots in the first and second sets of supporting members.

9. A suspended ceiling as claimed in claim 1, wherein the width of the broad rib formation where it joins the upper principal surface of the panel is substantially equal to the diameter of the pipe.

* * * * *